Nov. 24, 1959  S. L. MERKEL  2,914,720
VOLTAGE AND CURRENT REGULATOR
Filed Aug. 5, 1957
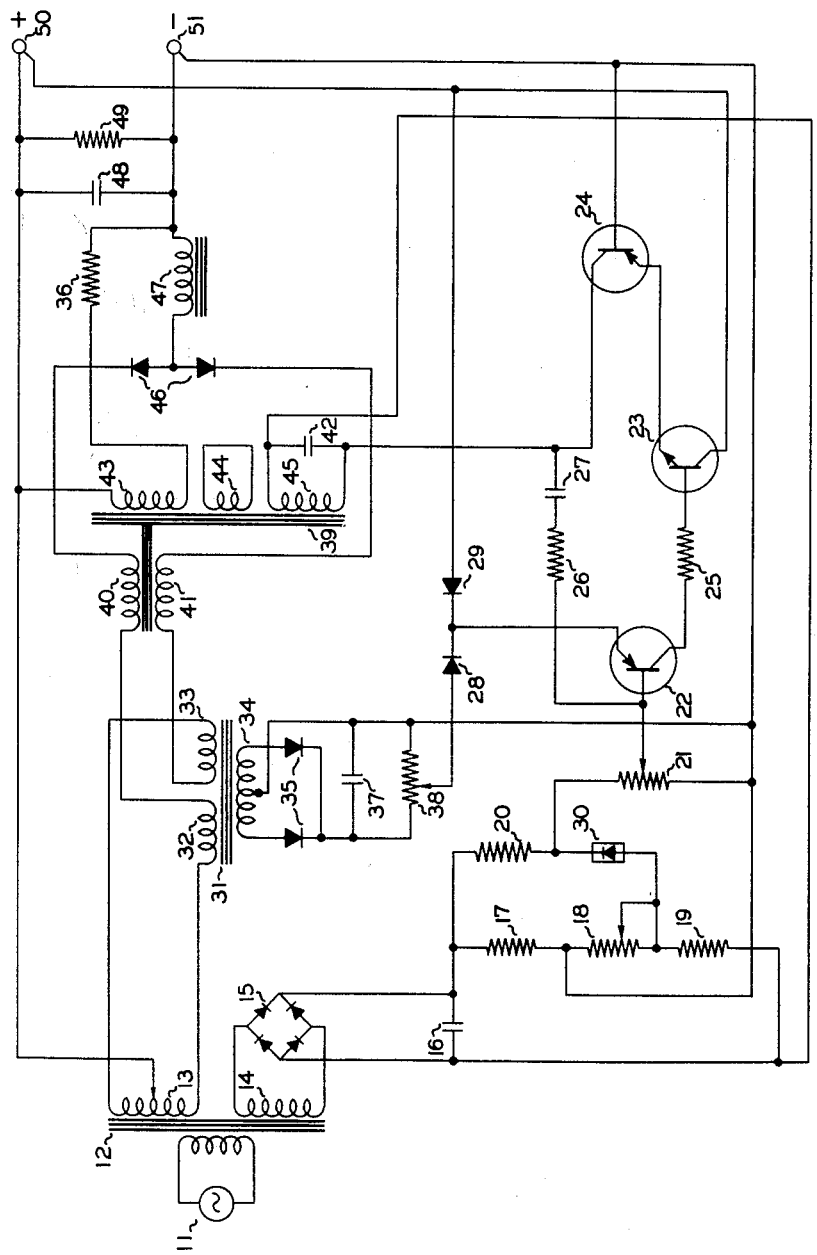
*INVENTOR.*
*STEPHEN L. MERKEL*
BY
*Woodling and Krost*
*attys*

United States Patent Office 2,914,720
Patented Nov. 24, 1959

2,914,720

VOLTAGE AND CURRENT REGULATOR

Stephen L. Merkel, Lorain, Ohio, assignor to Lorain Products Corporation, a corporation of Ohio Application August 5, 1957, Serial No. 676,204

11 Claims. (Cl. 321—19)

This invention deals with a voltage and current regulator for a rectifying system and particularly with a regulator which employs transistors to control the impedance of a saturable reactor in a regulated rectifying system.

An object of the invention is to control the output of a regulated rectifier by comparing its voltage with a standard voltage produced across a Zener diode.

Another object of my invention is to employ a Zener diode as a voltage standard for a rectifying system having an output voltage lower than the voltage across the Zener diode.

Another object of my invention is to employ a transistor amplifier to control the saturation of a saturable reactor or transductor, in a rectifying system and to minimize the effect of ripple voltage on the transistor amplifier.

A further object of my invention is to prevent oscillation or hunting from occurring in a system of the type described.

Still another object of my invention is to provide a current regulating system and a voltage regulating system and to transfer the control of a regulated rectifier from the voltage regulating system to the current regulating system at a predetermined value of load current.

An additional object of my invention is to minimize or substantially eliminate effects of A.-C. line voltage variations on the output voltage of a regulated rectifier.

A Zener diode is a constant voltage device which has excellent characteristics for use as a voltage standard for controlling the output voltage of a regulated device. At present, the Zener diodes which have the most favorable properties for this application are those having voltages in the order of six volts. When the voltage to be regulated is less than the voltage of the constant voltage device, it becomes necessary to use a voltage divider across the constant voltage device rather than a voltage divider across the voltage to be controlled. One of the features of my invention is the use of a voltage divider across the constant voltage device without the loss of the regulating properties of the constant voltage device.

A voltage and current regulator embodying the features of my invention is capable of controlling the output voltage and current within an accuracy of a small fraction of one percent. Therefore, if the output voltage controlled by the regulator includes ripple voltage of the same magnitude or greater magnitude than the degree of accuracy to which the output voltage is controlled, the regulating device could be overloaded by a ripple signal which would prevent proper operation of the control system. An additional object of my invention is to provide a regulating device which will distinguish between the ripple voltage and the voltage to be controlled and will not be adversely affected by the presence of a ripple voltage considerably greater than the voltage deviation to be controlled.

By my invention I am able to distinguish between the ripple voltage and the required signal voltage by the use of an A.-C. inverse feed-back network which reduces the gain of the system at the ripple frequency to a low level, while maintaining high gain at frequencies which represent deviations in the average output voltage. This same inverse feed back network also serves to prevent oscillation or hunting in the system by reducing the gain of the system at frequencies at which it might otherwise tend to oscillate.

Other objects and a better understanding of my invention may be had by referring to the following specification and claims taken in conjunction with the accompanying drawing which is a schematic diagram of a voltage and current regulator embodying the features of my invention.

With reference to the diagram, the alternating current source 11 supplies power to transformer 12 which has center-tapped secondary winding 13, and an auxiliary secondary winding 14. The power rectifier 46 is energized from center-tapped winding 13 through impedance windings 40 and 41 of the saturable reactor or transductor 39. The core of the saturable reactor is depicted schematically by a T-shaped figure; the actual construction of the saturable reactor may be according to systems known in the art and may employ two separate magnetic cores with winding 40 on one core, winding 41 on the other core, and control windings 43, 44, and 45 common to both cores, or it may comprise a single core structure having multiple flux paths, with winding 40 on one flux path, winding 41 on another flux path, and windings 43, 44, and 45 on a portion of the core common to both flux paths.

The rectifier circuit shown is of the self-saturating type, in which the flow of current to the full-wave rectifier 46 is controlled by the impedance of windings 40 and 41. The impedance of these windings is controlled by current through the saturating windings 43 and 45, and also by the saturating effect of load current which automatically reduces the impedance as the load current increases. Winding 44 is shown as a shorted winding used to minimize ripple voltages in windings 43 and 45. Other arrangements known in the art may be used for the same purpose, for example a capacitor such as capacitor 42 may be connected across one of the windings, or a resistor, not shown, can be connected across one of the windings to minimize the ripple voltage.

The output of the full-wave rectifier 46 is filtered by inductance 47 and capacitor 48 and supplied to output terminals 50 and 51. A bleeder resistor 49, as shown, may be used to help control the voltage across terminals 50 and 51 under light load or no load conditions.

The circuit as shown is adapted primarily as a low voltage device, in which the voltage across the load terminals 50 and 51 may be less than the voltage across the constant-voltage device used as a reference standard, but it will be apparent that some of the features of my invention are not limited to low voltage devices.

The voltage control circuit shown employs a separate power rectifier 15, energized from secondary winding 14 on transformer 12. Capacitor 16 filters the output of rectifier 15 which is then applied to Zener diode 30 through resistors 19 and 20. The resistors 17, 18 and 19 comprise a voltage divider connected across the output of rectifier 15. These components are preferably proportioned so that the current through resistors 17, 18 and 19 is large compared with the current through the Zener diode 30.

The voltage divider 21 is connected so that the voltage impressed across it is equal to the constant voltage from Zener diode 30 minus the voltage across resistor 18. Resistor 18 is adjustable, and is preferably set so that its voltage will be less than the voltage across Zener diode 30. As the voltage of source 11 increases, the voltage across resistor 18 will also increase, so that the voltage impressed across the voltage dividing resistor 21 can be held constant or caused to decrease slightly with increasing voltage of source 11.

The base of transistor 22 is connected to the slider of the voltage divider 21. The lower terminal of voltage divider 21 is connected to the negative output terminal 51. The emitter of transistor 22 is connected to the positive terminal 50 through diode 29. The voltage between the base and emitter of transistor 22, is therefore equal to the difference between the voltage across output terminals 50 and 51 and the voltage across a portion of voltage divider 21. If the voltage across output terminals 50 and 51 exceeds the voltage across the portion of voltage divider 21 which is in the circuit, the transistor 22 becomes conductive.

Transistor 22 is the first element in a three stage transistor amplifier comprising the P-N-P transistor 22, N-P-N transistor 23, and P-N-P transistor 24. Transistors 22 and 24 are connected in this circuit with the signal applied between the emitter and the base. In the circuit of transistor 23, the signal is applied between base and collector.

When transistor 22 is conductive, current flows from its emitter, to the collector, through protective resistor 25 to the base of transistor 23. The base current of transistor 23 flows through its emitter to the emitter of transistor 24 which is connected to the negative output terminal 51. Transistor 23 acts as a current amplifier; when transistor 22 is conductive, making transistor 23 conductive, current flows from its collector to its emitter to the emitter of transistor 24 to make transistor 24 conductive. The collector-to-base voltage of transistor 24 is supplied from rectifier 15 by means of the voltage divider 17, 18, and 19. The collector current of transistor 24 flows through saturating winding 45 on saturable reactor or transductor 39. The current through saturating winding 45 increases whenever the voltage across terminals 50 and 51 is above normal. This winding is, therefore, polarized so that it reduces the saturation of the saturable reactor or transductor 39, which is initially saturated by current through bias winding 43.

Bias winding 43 is energized directly across output terminals 50 and 51 through series resistor 36. The biasing effect of the current through winding 43 is preferably proportioned so that, in the absence of current through saturating winding 45, the saturable reactor or transductor 39 is at least sufficiently saturated so that, with the self-saturating effect of the load current, full load at normal voltage can be supplied from D.-C. output terminals 50 and 51 when the voltage of source 11 is at its minimum normal value. The output of the transistor amplifier, which is the collector current of transistor 24, flows through the winding 45 in a direction to reduce the saturation of saturable reactor or transductor 39 and limit the voltage across terminals 50 and 51 to a value determined by the voltage regulating circuit. As previously described, the standard voltage is obtained from voltage divider 21, which in turn is energized from Zener diode 30.

The gain of the transistor amplifier is sufficient so that relatively little current is drawn from voltage divider 21, and the potential which is used as the reference standard is influenced very little by the amount of current handled by the amplifier. However, changes in the voltage of source 11 do require corrective changes in the saturating current through winding 45, which in turn requires some change in the base current of transistor 22. I am able to compensate for this slight change in current by the circuit previously described, in which resistor 18 is in series with Zener diode 30 so that the voltage impressed across voltage divider 21 will diminish slightly as the voltage of source 11 increases. Resistor 18 can be adjusted so that this change in voltage impressed across resistor 21 is exactly sufficient to counteract the changes in base current of transistor 22 with changes of source voltage, enabling my voltage and current regulator to maintain a precisely regulated constant voltage across terminals 50 and 51 in spite of changes in the voltage of source 11.

Another feature of my voltage and current regulator circuit is the inverse feedback network comprising resistor 26 and capacitor 27 connected between the collector of transistor 24 and the base of transistor 22. This inverse feed back network has two functions, it serves as an anti-hunt network, and as protection against overloading the amplifier by ripple voltage. Saturable reactor 39, filter choke 47 and filter capacitor 48 produce a time delay which can be considered a phase shift in the regulating system. The inverse feed back network reduces the gain of the system at the frequency which corresponds to a phase shift of 180 degrees and thereby effectively prevents hunting or oscillation. The inverse feed back network and transistor amplifier are preferably proportioned so that high gain is obtained at frequencies up to the range which corresponds to the maximum usable speed of response of the saturable reactor system. At higher frequencies, where the inherent delay in the reactor system is such that hunting may occur, the gain of the amplifier is substantially reduced to insure against the possibility of oscillation in the system.

The output voltage across terminals 50 and 51 may include a ripple voltage which is large compared with the D.-C. voltage variation across these terminals. When this is the case, the signal voltage applied to the transistor amplifier includes this ripple voltage which may mask the D.-C. voltage deviation which is to be corrected. In order to prevent overloading of the amplifier by the ripple voltage, and to maintain the sensitivity of the amplifier to the required signal voltage, the feedback network comprising resistor 26 and capacitor 27 reduces the gain of the amplifier to a very low figure at the ripple frequency without substantially reducing its gain at frequencies which represent deviations in the output voltage which are to be corrected by the transistor amplifier.

I prefer to keep the ripple voltage which may be induced in winding 45 from appearing in the transistor circuit in appreciable amounts, and for this purpose employ a shorted winding 44, shown coupled to the saturating windings 43 and 45. Capacitor 42 is also shown connected across winding 45. This capacitor may be used instead of or in addition to the shorted winding 44.

Another feature of my invention is a current limiting arrangement whereby I am able to limit the output current to a predetermined maximum value, to prevent possible overloading of the circuit components or tripping of circuit breakers or protective fuses. The current limiting feature, as shown, comprises a current transformer 31 having primary windings 32 and 33 connected between the secondary winding 13 and the transductor windings 40 and 41. Winding 32 carries current during the conducting period of one of the elements of rectifier 46, whereas winding 33 carries current during the conducting period of the other element of rectifier 46. Windings 32 and 33 are preferably polarized so that the unidirectional components cancel each other and the transformer 31 is energized effectively by an alternating current. It will be evident that a single primary winding could be used for this purpose if the primary winding were connected between the source 11 and the primary winding of input transformer 12. The chief advantage of the arrangement as shown is that it allows more flexibility in the choice of primary winding arrangements for transformer 12, particularly if the unit is to be operated from a number of different source voltages.

The secondary winding 34 on current transformer 31 supplies power to a full-wave rectifier 35 which, in turn, supplies rectified current to resistor 38 which is bridged by capacitor 37. The voltage across resistor 38 increases directly in proportion to the output current supplied from load terminals 50 and 51. Resistor 38 is a voltage divider arranged to supply an adjustable voltage through diode 28 to the emitter of transistor 22. The voltage divider 38 is adjusted so that at a predetermined value of load current the voltage applied through diode 28 to the emitter of transistor 22 exceeds the voltage applied through diode 29. Under this condition, my regulating circuit becomes a current regulator, as the voltage across voltage divider 38 is balanced against the standard voltage from voltage divider 21. Any further increase in load current causes a very substantial increase in the output of the transistor amplifier, which, flowing through winding 45, raises the impedance of transductor 39 and lowers the voltage across output terminals 50 and 51. My regulating circuit, therefore, acts as a voltage regulator for load currents less than a predetermined maximum current, and as a current regulator when the load current exceeds this predetermined maximum.

Although the circuit as shown employs two diodes 28 and 29, diode 29 can be replaced by a resistor of suitable value, chosen so that it introduces relatively little voltage drop while the circuit is acting as a voltage regulator, but nevertheless has a high resistance compared with resistor 38 and the forward resistance of diode 28. If these conditions are met, the potential from voltage divider 38 supplied through diode 28 will be impressed on the collector of transistor 22 even when the diode 29 is replaced by a resistor.

Other changes which will be apparent to those skilled in the art may also be made without departing from the practice of my invention. The specific embodiment of my invention shown herein, is given merely by way of example, and numerous changes in the details of construction and the combination and arrangement of parts may be resorted to without departing from the spirit and scope of my invention as hereinafter claimed.

What is claimed is:

1. A rectifying arrangement having alternating current input terminals and direct-current output terminals and comprising in combination, rectifying means, saturable reactor means for controlling the current supplied through said rectifying means to said output terminals, winding means for controlling the impedance of said saturable reactor means, a constant voltage device, a transistor amplifier, circuit means for supplying to said amplifier a differential signal from the constant voltage device and the output terminals, means for applying the output of said amplifier to said winding means, and an alternating-current feed-back circuit between the output and the input of said amplifier for reducing the alternating-current gain of said amplifier.

2. In a voltage regulator having control means responsive to current through winding means thereon, a transistor amplifier arranged with its output connected to said winding means, a constant voltage device, circuit means for comparing the voltage to be regulated with the voltage of said device and for applying the difference to the input of said amplifier, and an alternating current path extending from the output to the input of said amplifier for reducing the alternating current gain of said amplifier, whereby deviations in the regulated output voltage are corrected by said amplifier, and said amplifier is made relatively insensitive to ripple voltage superimposed on said regulated voltage.

3. In a voltage regulator having control means responsive to a unidirectional current impressed on said control means, the combination of a constant voltage device, a transistor amplifier, a first circuit for comparing the voltage to be regulated with the voltage of said constant voltage device and impressing the difference upon said transistor amplifier, means for applying the output of said transistor amplifier to said control means, and an alternating current circuit extending from the output to the input of said transistor amplifier and arranged to reduce the alternating current gain of said amplifier substantially below its direct current gain.

4. In a regulated rectifier having alternating current input terminals connected to direct current output terminals through saturable reactor means and rectifier means, the combination of first and second saturating windings on said saturable reactor means, an auxiliary rectifier, means for energizing said auxiliary rectifier from said alternating current input terminals, a Zener diode, first, second, third and fourth resistors, a first circuit energized from said auxiliary rectifier and comprising said first, second, and third resistors in series, a second circuit energized from said auxiliary rectifier and comprising said fourth resistor, said Zener diode, and said third resistor in series, a voltage divider connected from the junction between said first and second resistors to the junction between said fourth resistor and said Zener diode, a transistor amplifier employing transistors of P-N-P and N-P-N types, said amplifier comprising first, second, and third transistors, said first and third transistors being of one of said types, said second transistor being of the other of said types, a circuit extending from the base of the first transistor to an intermediate point on said voltage divider, a circuit extending from the junction between said first and second resistors to the first of said output terminals, a circuit extending from the second of said output terminals to the emitter of said first transistor, the collector of said first transistor being connected to the base of said second transistor, the emitters of said second and third transistors being connected together, the collector of said second transistor being connected to said second output terminal, the collector of said third transistor being connected through said first saturating winding to the terminal of said third resistor which is energized from said auxiliary rectifier the base of said third transistor being connected to said first output terminal, and means for energizing said second saturating winding in opposition to said first saturating winding, the variations in voltage across said second resistor with variable input voltage compensating for corresponding changes in the voltage across said Zener diode and for changes in the base current of said first transistor to establish a compensated voltage whereby said transistor amplifier maintains constant voltage across said output terminals.

5. In a voltage regulator having control means responsive to current through winding means thereon, a transistor amplifier for controlling the current through said winding means, a constant voltage device, an auxiliary rectifier, a resistance path energized from said auxiliary rectifier, circuit means for impressing on the input of said amplifier a voltage derived from said constant voltage device, said resistance path, and from the voltage to be regulated, an alternating current path extending from the output to the input of said amplifier for reducing the alternating current gain of said amplifier, and a direct current path extending from said auxiliary rectifier through said winding means to the output of said amplifier.

6. A rectifying arrangement having alternating current input terminals and direct current output terminals and comprising in combination, first rectifying means, saturable reactor means for controlling the current supplied through said first rectifying means to said output terminals, winding means for controlling the impedance of said saturable reactor means, second rectifying means, means for energizing said second rectifying means from said alternating current input terminals, a resistance path, a constant voltage device, means for energizing said resistance path and said constant voltage device from said second rectifying means, a voltage divider, means for energizing said voltage divider from said constant voltage device and from a portion of said resistance path, means for comparing a portion of the voltage across said voltage divider with the voltage across said output terminals, and means responsive to the difference between said voltages for controlling the current through said winding means.

7. A rectifying arrangement having alternating current input terminals and first and second direct current output terminals and comprising in combination, a first rectifier, a saturable reactor for controlling the current supplied through said first rectifier to said output terminals, a winding for controlling the impedance of said saturable reactor, a second rectifier, circuit means for energizing said second rectifier from said input terminals, a constant voltage device, a resistance path, means for energizing said constant voltage device and said resistance path from said second rectifier, a voltage divider, means for energizing said voltage divider from the constant voltage device and a portion of said resistance path, a transistor amplifier having three transistors of the N-P-N and P-N-P types, the first and third transistors being one of said types and the second transistor being of the other of said types, a first current path extending from the first output terminal to the emitter of said first transistor and from the base of said first transistor through a portion of said voltage divider to said second output terminal, a second current path extending from said first terminal to the collector of said second transistor and from the emitter of said second transistor through the emitter-base of said third transistor to said second output terminal, a circuit extending from the collector of said first transistor to the base of said second transistor, and a circuit exending from said second rectifier through said winding on the saturable reactor to the collector of said third transistor, and from the base of said third transistor to an intermediate point on said resistance path, whereby said transistor amplifier controls the current through said saturating winding to regulate the voltage across said output terminals.

8. A rectifying arrangement having alternating current input terminals and direct current output terminals and comprising in combination, first and second rectifiers, a saturable reactor for controlling the current supplied through said first rectifier to said output terminals, a winding for controlling the impedance of said saturable reactor, a constant voltage device, a transistor amplifier, means for energizing said second rectifier from said input terminals, a resistance path energized from said second rectifier, a constant voltage device energized from said second rectifier, a voltage divider energized with voltage from said constant voltage device reduced by voltage from a portion of said resistance path, means for comparing the voltage across a portion of said voltage divider with the voltage across said output terminals and for applying the difference as a signal to said transistor amplifier, means for impressing the output of said transistor amplifier on said winding to control the impedance of said saturable reactor, and an alternating current feedback circuit between the output and the input of said amplifier for reducing the alternating current gain of said amplifier, whereby a voltage lower than the voltage of said constant voltage device can be regulated across said output terminals by said transistor amplifier.

9. A rectifier arrangement having alternating current input terminals and direct current output terminals and comprising in combination, rectifying means, saturable reactor means for controlling the current supplied through said rectifying means to said output terminals, winding means for controlling the impedance of said saturable reactor means, a constant voltage device, a transistor amplifier, and current responsive means, first circuit means including a first diode for supplying to said amplifier a differential signal from the constant voltage device and the output terminals, means for deriving a voltage which increases with increasing load through said output terminals, second circuit means including a second diode for supplying to said amplifier a differential signal from the constant voltage device and the current responsive means, and an alternating current feedback circuit between the output and the input of said amplifier for reducing the alternating current gain of said amplifier, whereby said amplifier responds to direct current signals from said first and second circuit means and is relatively unaffected by alternating current signals from said circuit means, the output of said second circuit means superseding the output of said first circuit means at a predetermined value of load current to limit the output current of said rectifying arrangement.

10. In a ripple signal control circuit for a regulating rectifier having a terminal system including alternating current input and direct current output terminals, a regulator circuit connected to said output terminals and correctively responsive to deviations in voltage at said output terminals, a rectifier circuit connected between said input and output terminals for delivering unidirectional current to said output terminals and an amplifier circuit connected across said output terminals and arranged to deliver, to said regulator, control energy correctively responsive to said voltage deviations, means for reducing ripple signal superimposed on said voltage deviations including an alternating current circuit connected to the output of said amplifier to receive said ripple signal and arranged to deliver to the input of said amplifier said ripple signal substantially out of phase with respect to the ripple signal impressed thereon from said output terminals, thereby to reduce the ripple by substantial phase opposition.

11. In a ripple signal control circuit for a regulating rectifier having a terminal system including alternating current input and direct current output terminals, a regulator circuit connected to said output terminals and correctively responsive to deviations in voltage at said output terminals, a rectifier circuit connected between said input and output terminals for delivering unidirectional current to said output terminals and an amplifier circuit connected across said output terminals and arranged to deliver, to said regulator, control energy correctively responsive to said voltage deviations, said amplifier circuit including transistor means of the type having current input and output means, a base-emitter signal circuit and an emitter-collector load circuit, means for electrically connecting the base-emitter signal circuit of transistor means in said amplifier circuit to said output terminals and means for reducing ripple signal superimposed on said voltage deviations in said amplifier from said output terminals, including an A.-C. circuit connected between the emitter-collector load circuit of transistor means in said amplifier and the base-emitter signal circuit of transistor means in said amplifier circuit to receive ripple signal from said emitter-collector load circuit and deliver said signal into said base-emitter circuit in substantial phase opposition to the ripple signal appearing across said output terminals.

References Cited in the file of this patent
UNITED STATES PATENTS

| | | |
|---|---|---|
| 2,734,165 | Knowlton | Feb. 7, 1956 |
| 2,751,545 | Chase | June 19, 1956 |
| 2,810,877 | Silver | Oct. 22, 1957 |